(12) United States Patent
Chen

(10) Patent No.: US 8,430,384 B2
(45) Date of Patent: Apr. 30, 2013

(54) DEVICE AND METHOD FOR PICKING UP OPTICAL ELEMENTS

(75) Inventor: Hsiang-Hung Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 445 days.

(21) Appl. No.: 12/778,136

(22) Filed: May 12, 2010

(65) Prior Publication Data

US 2011/0052365 A1    Mar. 3, 2011

(30) Foreign Application Priority Data

Sep. 2, 2009  (CN) .......................... 2009 1 0306500

(51) Int. Cl.
*B25B 11/00*    (2006.01)

(52) U.S. Cl.
USPC ............................................ 269/21; 269/900

(58) Field of Classification Search ............ 269/21, 269/900, 903
See application file for complete search history.

(56) References Cited

U.S. PATENT DOCUMENTS

| | | | | |
|---|---|---|---|---|
| 2,717,756 A * | 9/1955 | Keeshan et al. | ............... | 248/363 |
| 3,321,201 A * | 5/1967 | Brewster | ......................... | 269/21 |
| 4,640,501 A * | 2/1987 | Poland | ............................ | 269/21 |
| 4,721,462 A * | 1/1988 | Collins, Jr. | .................... | 432/253 |
| 4,976,296 A * | 12/1990 | Pope | ............................... | 141/46 |
| 5,191,218 A * | 3/1993 | Mori et al. | ............... | 250/453.11 |
| 5,374,829 A * | 12/1994 | Sakamoto et al. | ........ | 250/453.11 |
| 5,534,073 A * | 7/1996 | Kinoshita et al. | ............. | 118/728 |
| 5,563,683 A * | 10/1996 | Kamiya | .......................... | 355/53 |
| 5,700,725 A * | 12/1997 | Hower et al. | .................. | 438/758 |
| 5,707,051 A * | 1/1998 | Tsuji | ............................... | 269/21 |
| 5,857,667 A * | 1/1999 | Lee | .................................. | 269/21 |
| 6,184,972 B1 * | 2/2001 | Mizutani et al. | ................ | 355/72 |
| 6,257,564 B1 * | 7/2001 | Avneri et al. | .................... | 269/21 |
| 6,271,498 B1 * | 8/2001 | Miyake et al. | .......... | 219/121.43 |
| 6,272,989 B1 * | 8/2001 | Misono et al. | ................ | 101/474 |
| 6,389,677 B1 * | 5/2002 | Lenz | .............................. | 29/559 |
| 6,464,790 B1 * | 10/2002 | Sherstinsky et al. | .......... | 118/715 |
| 6,464,795 B1 * | 10/2002 | Sherstinsky et al. | .......... | 118/728 |
| 6,550,669 B1 * | 4/2003 | Walz et al. | ..................... | 228/264 |
| 6,706,647 B1 * | 3/2004 | Tsutsumi et al. | ............. | 438/785 |
| 7,078,262 B2 * | 7/2006 | Yamamoto et al. | ........... | 438/106 |
| 7,105,056 B2 * | 9/2006 | Hartig et al. | .................... | 118/50 |

(Continued)

FOREIGN PATENT DOCUMENTS

| | | | | |
|---|---|---|---|---|
| JP | 60127935 A | * | 7/1985 | |
| JP | 62124844 A | * | 6/1987 | |
| JP | 04322220 A | * | 11/1992 | |
| JP | 07050336 A | * | 2/1995 | |

*Primary Examiner* — Joshua J Michener
*Assistant Examiner* — Elizabeth A Plummer
(74) *Attorney, Agent, or Firm* — Altis Law Group, Inc.

(57) ABSTRACT

A device capable of picking up optical elements includes a first suction member, a second suction member, a vacuum pump unit and a liquid spraying unit. The first suction member defines a chamber. The second suction member is arranged around the first suction member to form an annular space. The vacuum pump unit pumps the air out of the chamber and the annular space to create a vacuum therein, which generates a suction force to suck the optical elements respectively. The liquid spraying unit communicates with the chamber and the annular space, and pours the liquids into the chamber and the annular space. When the liquid volatilizes in the chamber and the annular space to fill the vacuum, the optical elements disengage from the first suction member and the second suction member respectively.

16 Claims, 4 Drawing Sheets

U.S. PATENT DOCUMENTS

2001/0001945 A1* 5/2001 Hiraga et al. ............... 118/50
2003/0001103 A1* 1/2003 Kobayashi et al. ...... 250/440.11
2007/0063402 A1* 3/2007 Soyama ..................... 269/21
2010/0261122 A1* 10/2010 Inatomi ..................... 430/325

* cited by examiner

DEVICE AND METHOD FOR PICKING UP OPTICAL ELEMENTS

BACKGROUND

1. Technical Field

The present disclosure relates to devices capable of picking up objects, particularly, to a device capable of picking up optical elements by way of vacuum suction.

2. Description of Related Art

When assembling a lens module, an auxiliary tool is usually used to pick up optical elements, such as lenses, and to release the picked optical element to a desired position. Because of the miniaturized size of the optical elements, it is often difficult for the user to accurately position these optical elements using conventional auxiliary tools.

Therefore, what is needed is a device capable of picking up optical elements to overcome the described shortcoming.

DETAILED DESCRIPTION

Figure 1:
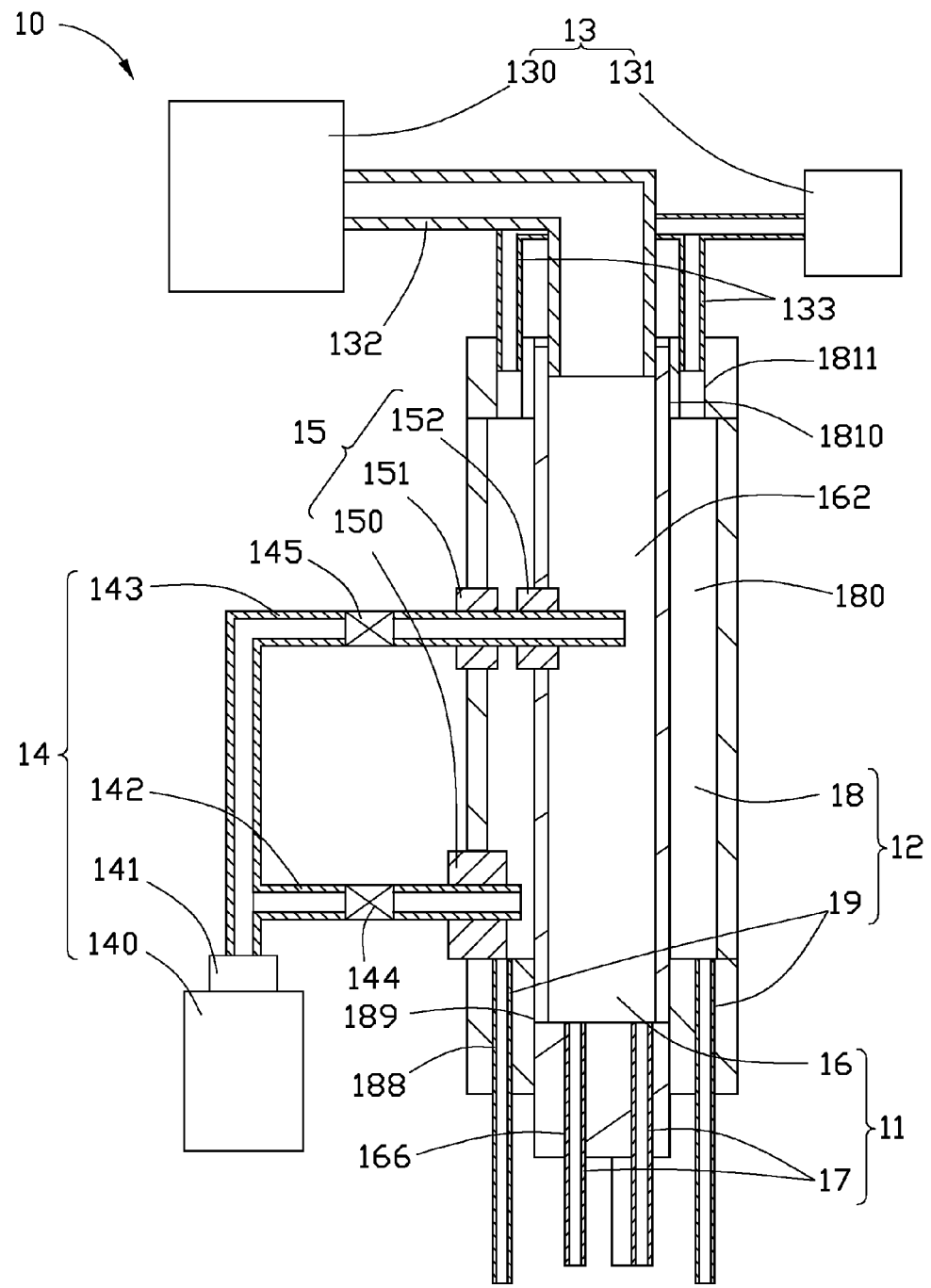
FIG. 1 is a cross-sectional view of a device capable of picking up optical elements in accordance with an exemplary embodiment.

Referring to FIG. 1, a device 10 capable of picking up and dispensing optical elements is provided. The device 10 includes a first suction member 11, a second suction member 12, a vacuum pump unit 13, a liquid spraying unit 14 and a sealing element 15.

The first suction member 11 includes a first barrel 16 and at least one first suction tube 17.

Figure 2:
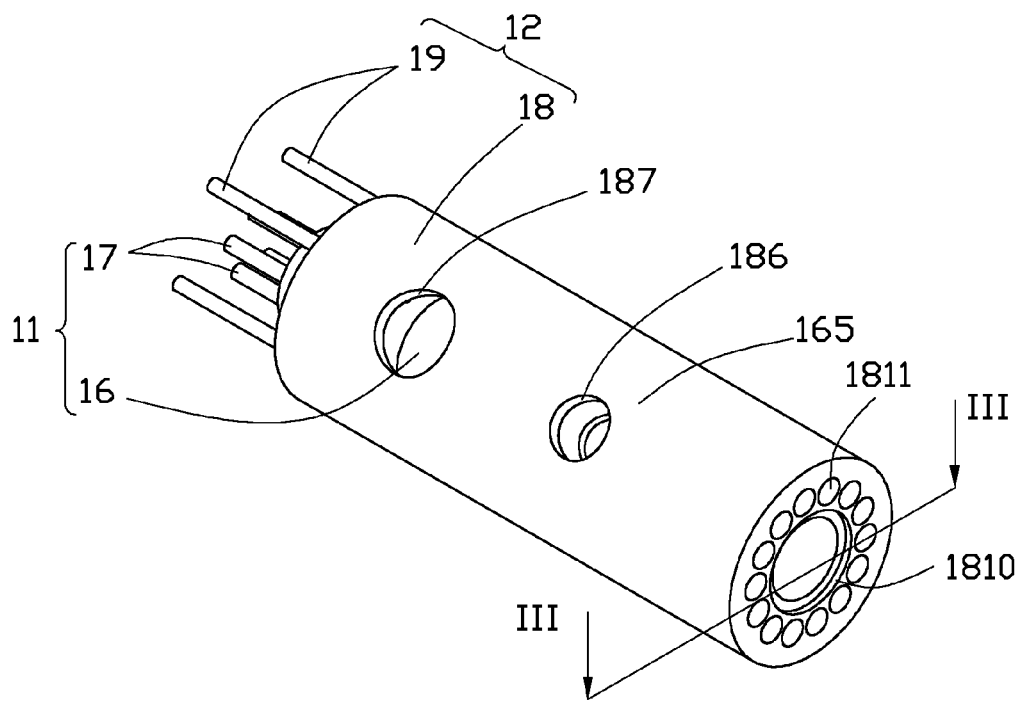
FIG. 2 is an isometric view of a first suction member and a second suction member of the device of FIG. 1.
Figure 3:
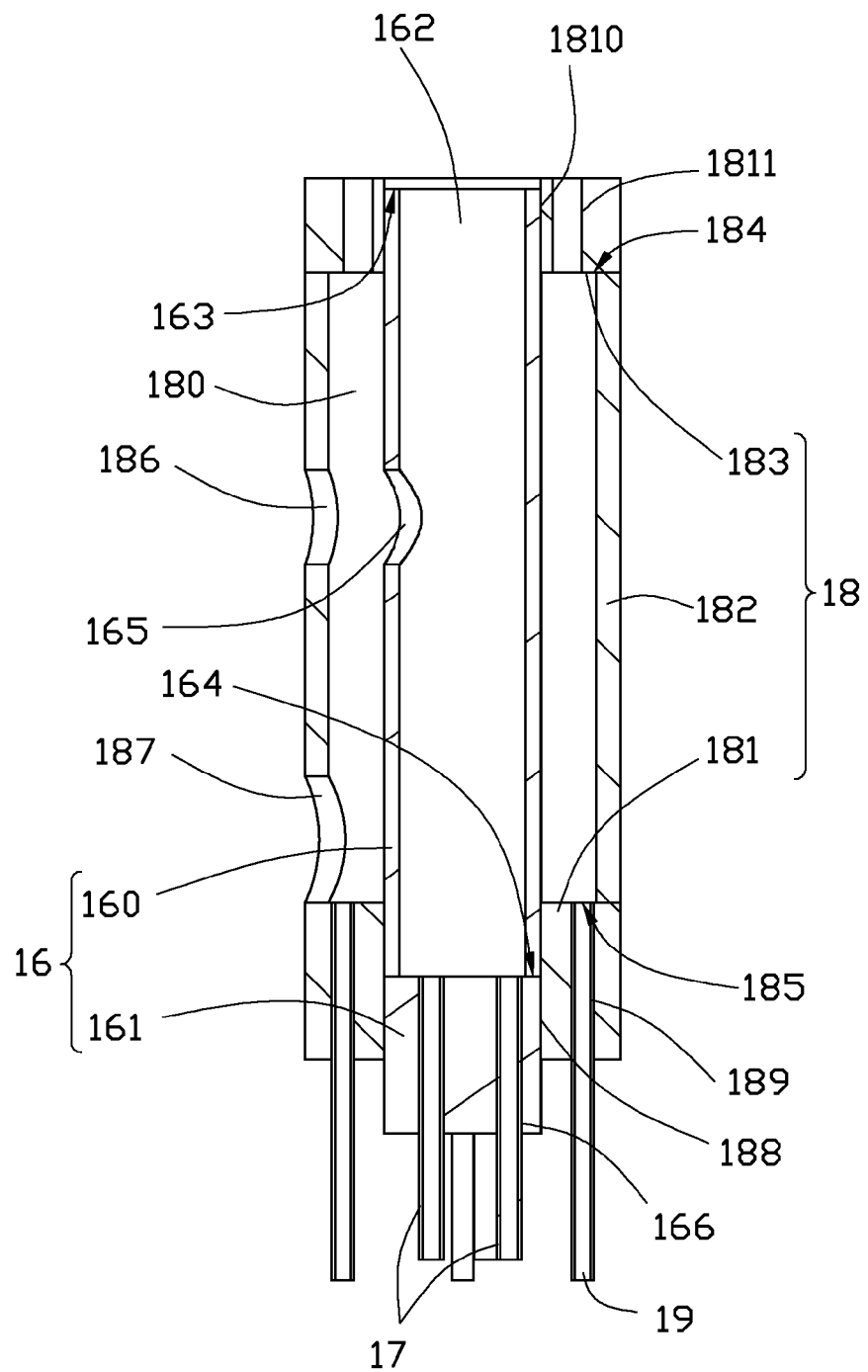
FIG. 3 is a cross-sectional view of the first suction member and the second suction member of FIG. 2, taken along line III-III.

Referring to FIGS. 2-3, the first barrel 16 includes a first sidewall 160 and a first bottom 161. The first sidewall 160 cooperates with the first bottom 161 to form a chamber 162. The first sidewall 160 includes a first upper surface 163 and a first lower surface 164. The first sidewall 160 also defines a first opening 165 extending there through. The first bottom 161 is fixed to the first lower surface 164 and defines at least one first through hole 166. In the embodiment, the number of the first through holes 166 is more than one. The first through holes 166 are arranged around the central axis of the first barrel 16.

The at least one first suction tube 17 communicates with the chamber 162, and is configured for sucking the optical elements. The at least one first suction tube 17 is attached to the first bottom 161. The number and the shape of the at least one first suction tube 17 matches those of the at least one first through hole 166 of the first bottom 161. In the embodiment, the number of at least one first suction tube 17 is more than one, and each of the first suction tubes 17 is inserted into the first bottom 161 through one of the first through holes 166, thereby communicating with the chamber 162. The lengths of the first suction tubes 17 are substantially equal. The lower parts of the first suction tubes 17 that protrude out of the first bottom 161 have substantially the same length.

The first suction member 11 is arranged within the second suction member 12. The second suction member 12 includes a second barrel 18 and at least one second suction tube 19. In the embodiment, the central axis of the first barrel 16 coincides with that of the second barrel 18.

The first barrel 16 is arranged within the second barrel 18, and cooperates with the second barrel 18 to form an annular space 180. The second barrel 18 includes second bottom 181, a second sidewall 182 and a second top 183.

The second bottom 181 is adjacent to the first bottom 161, and contacts a portion of the first sidewall 160 adjacent to the lower surface 164. The second sidewall 182 includes a second upper surface 184 and a second lower surface 185. The second upper surface 184 is adjacent to the first upper surface 163, and the second lower surface 185 is adjacent to the first lower surface 164. The second bottom 181 is fixed to the second lower surface 185. The second top 183 is fixed to the second upper surface 184.

The second bottom 181 defines a second orifice 188 and at least one first orifice 189 penetrating two ends thereof. The second orifice 188 is substantially located in the center of the second bottom 181. One end of the first barrel 16 having the first upper surface 163 is received in the second barrel 18. The inner surface of the second orifice 188 contacts the first sidewall 160 tightly. In the embodiment, the number of the first orifice 189 is more than one, and the first orifices 189 are arranged around the second orifice 188. The size of the first orifice 189 is less than that of the second orifice 188. In another embodiment, the number of the first orifices 189 may be one.

The second top 183 is fixed to the second upper surface 184. The second top 183 defines a first hole 1810 and at least one second hole 1811. The first hole 1810 and at least one second hole 1811 penetrate two ends of the second top 183. The first hole 1810 is located in the center of the second top 183. A diameter of the first hole 1810 is substantially equal to that of the second orifice 188. The end of the first barrel 16 having the first upper surface 163 is received in the first hole 1810. The inner surface of the first hole 1810 stays in tight contact with the first barrel 16, which creates an airtight condition. In the embodiment, the number of the at least one second hole 1811 is more than one, and the second holes 1811 are arranged around the first hole 1810.

The second sidewall 182 defines a second opening 186 and a third opening 187 extending there through. The second opening 186 is adjacent to the second top 183, and is aligned with the first opening 165. The third opening 187 is adjacent to the second bottom 181.

The at least one second suction tube 19 is configured for sucking another optical element. The second suction tubes 19 are hollow tubes, and are attached to the second bottom 181. The distances between the suction tubes 19 are greater than the distances between the suction tubes 17, which allows the suction tubes 19 to apply suction to larger optical elements than the suction tubes 17. The shape and number of the second suction tubes 19 match that of the first orifices 189. In the embodiment, the number of the second suction tube 19 is more than one. In another embodiment, the number of the second suction tube 19 may be only one. Each of the second suction tubes 19 is inserted into the second bottom 181 through the first orifice 189, thereby communicating with the annular space 180. The lengths of the second suction tubes 19 are substantially the same. The lower parts of the second suction tubes 19 that protrude out of the second bottom 181 have substantially the same length.

Referring to FIG. 1 again, the vacuum pump unit 13 includes a first vacuum pump 130 and a second vacuum pump 131. The first vacuum pump 130 and the second vacuum pump 131 are configured for pump the air out of the chamber 162 and the annular space 180 to create a vacuum respectively, which can thus generate a suction force. The desired optical elements can thus be sucked to the first suction tube 17 and the second suction tube 19 (shown in FIG. 4). In the embodiment, the first vacuum pump 130 includes a first connecting tube 132 communicating with the chamber 162. The outer surface of the first connecting tube 132 stays in tight contact with one portion of the inner surface of the first sidewall 160 adjacent to the first upper surface 163, thereby communicating with the chamber 162.

The second vacuum pump 131 includes at least one second connecting tube 133 communicating with the annular space 180. The shape and number of the second connecting tube 133 matches the second hole 1811. The outer surface of the second connecting tube 133 stays in tight contact with the inner surface of the second hole 1811, thereby communicating with the annular space 180.

In another embodiment, the vacuum pump unit 13 may include one vacuum pump which includes a first connecting tube 132 communicating with the chamber 162 and the second connecting tube 133 communicating with the annular space 180.

The liquid spraying unit 14 includes a container 140, a spraying pump 141, a first spraying conduit 142 and a second spraying conduit 143. The container 140 is configured for holding liquids. The spraying pump 141 is connected to the container 140 and the first spraying conduit 142. The spraying pump 141 is configured for drawing the liquids from the container 140 and pouring the liquids through the first spraying conduit 142 and the second spraying conduit 143 into the chamber 162 and the annular space 180. The first spraying conduit 142 extends through the third opening 187 of the second sidewall 182, thereby communicating with the annular space 180. A first valve 144 is connected to the first spraying conduit 142 to control the flow of the liquid in the first spraying conduit 142. The second spraying conduit 143 extends through the second opening 186 and the first opening 165 in turn, thereby communicating with chamber 162. A second valve 145 is connected to the second spraying conduit 143 to control the flow of the liquid in the second spraying conduit 143. Liquid from the container 140 can thus flow into the chamber 162 and the annular space 180 via the first spraying conduit 142 and the second spraying conduit 143, respectively.

In another embodiment, the number of the liquid spraying units 14 may be two. Each of the liquid spraying units 14 includes a spraying conduit. The two spraying conduits communicate with the chamber 162 and the annular space 180 respectively, thereby pouring the liquids into the chamber 162 and the annular space 180 respectively.

The sealing element 15 is configured for maintaining an air-tightness between the chamber 162 and the annular space 180. The sealing element 15 includes a first washer 150, a second washer 151, and a third washer 152. The first washer 150, the second washer 151, and the third washer 152 are annular and elastic. The first washer 150 is arranged around the first spraying conduit 142 and is retained tightly within the third opening 187. The second washer 151 is arranged around the second spraying conduit 143 and is retained tightly within the second opening 186. The third washer 152 is arranged around the second spraying conduit 143 and is retained tightly within the first opening 165.

Figure 4:
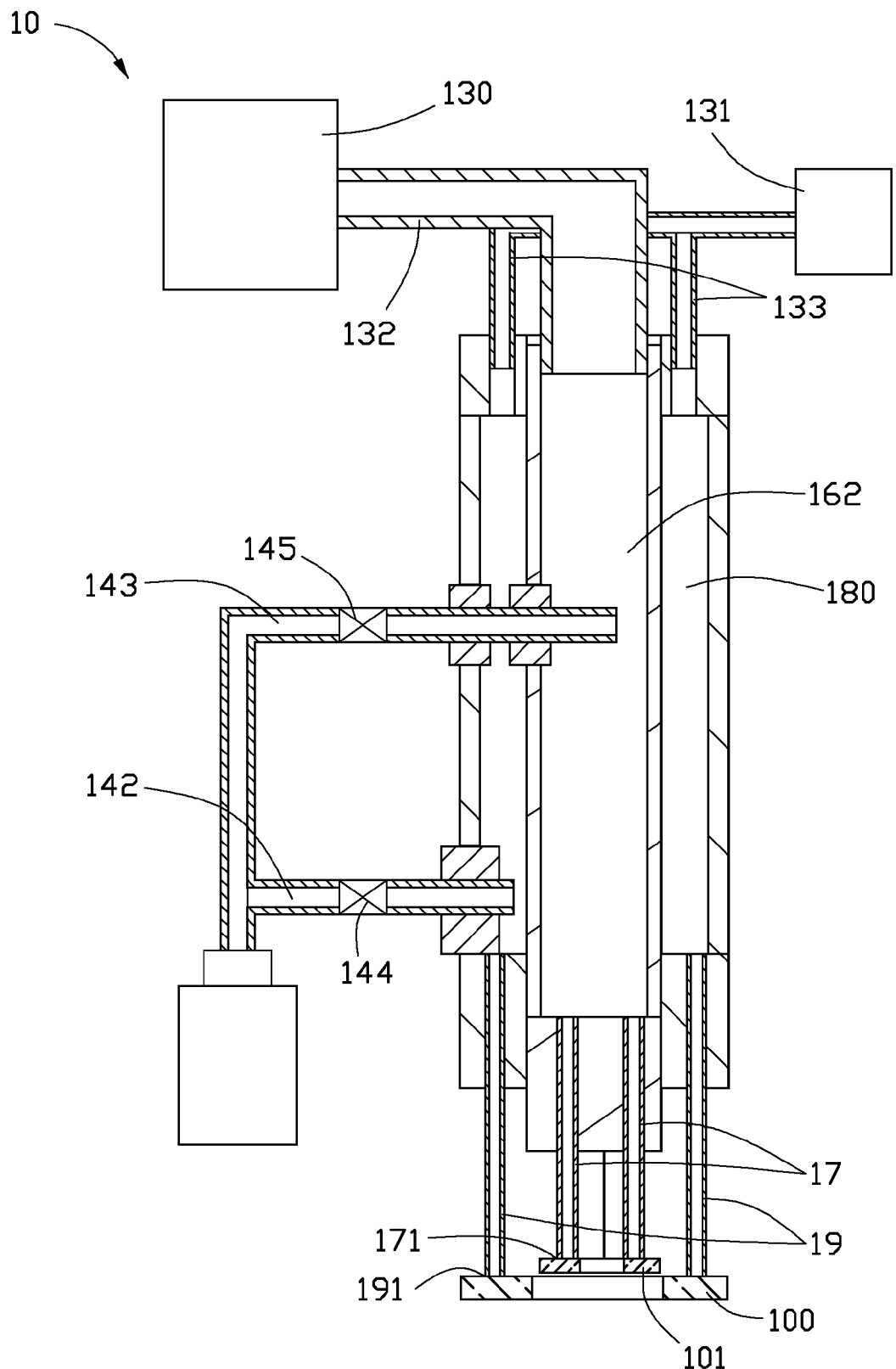
FIG. 4 is similar to FIG. 1, but showing that optical elements have been picked up by the device of FIG. 1.

Referring also to FIG. 4, a process for picking up the optical elements (shaping sheets 100 and 101) using the device 10 will be described in detail.

First, a first shaping sheet 100 and a second shaping sheet 101 are provided. The first shaping sheet 100 and the second shaping sheet 101 are annular. That is, both the first shaping sheet 100 and the second shaping sheet 101 define a through hole in a center. The inner diameter of the first shaping sheet 100 exceeds the outer diameter of the second shaping sheet 101.

The first vacuum pump 130 is then powered on, to pump the air out of the chamber 162 and the plurality of first suction tubes 17, so that a suction mouth 171 of the plurality of first suction tubes 17 form a vacuum, thereby sucking the second shaping sheet 101 to the first suction tubes 17.

The second vacuum pump device 131 is then powered on to pump the air out of the annular space 180 and the plurality of second suction tubes 19, so that a suction mouth 191 of the plurality of second suction tubes 19 form a vacuum, thereby sucking the first shaping sheet 100 to the second suction tubes 19.

After the first shaping sheet 100 has been held in position, the first valve 144 is opened while the second valve 145 is closed. The spraying pump 141 is then powered on to draw the liquid from the container 140 to the second suction tubes 19. The second vacuum pump device 131 is then powered off. When the liquid volatilizes in the second suction tubes 19 to fill the vacuum, the first shaping sheet 100 disengages from the second suction tubes 19. In the embodiment, the liquid is alcohol which can quickly volatilize in the annular space 180, thereby avoid staining of the first shaping sheet 100. The position may be the inner position of a drawtube.

After the first shaping sheet 100 disengages from the second suction tube 19, and the second shaping sheet 101 has been held in position. The second valve 145 is opened while the first valve 144 is closed. The spraying pump 141 is then powered on to draw the liquids from the container 140 to the first suction tubes 17. The first vacuum pump 130 is then powered off. When the liquid volatilizes in the first suction tubes 17 to fill the vacuum, the second shaping sheet 101 disengages from the first suction tubes 17.

In another embodiment, the users can also improve the lower lengths of the first suction tubes 17 and the second suction tubes 19 that protrude out of the second bottom 181, thereby driving the first suction tubes 17 and the second suction tubes 19 to simultaneously pick up and to release the optical elements in position.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A device capable of picking up optical elements, comprising:
   a first suction member defining a chamber, and comprising at least one first suction tube communicating with the chamber;
   a second suction member arranged around the first suction member to form an annular space, and comprising at least one second suction tube communicating with the annular space, wherein the height of the at least one second suction tube is higher than that of the at least one first suction tube;
   a vacuum pump unit configured for pumping air out of the chamber and the annular space to create a vacuum therein, which generates a suction force to allow the at least one first suction tube to suck an optical element, and to allow the at least one second suction tube to suck another optical element below the optical element; and
   a liquid spraying unit communicating with the chamber and the annular space, and configured for pouring liquid into the chamber and the annular space, wherein when the liquid volatilizes in the chamber and the annular space to fill the vacuum, the another optical element disengages from the at least one second suction tube, and the optical element disengages from the at least one first suction tube.

2. The device capable of picking up optical elements as described in claim 1, wherein the first suction member comprises a first barrel, the first barrel comprises a first sidewall and a first bottom, the first sidewall cooperates with the first bottom to form the chamber.

3. The device capable of picking up optical elements as described in claim 2, wherein the second suction member comprises a second barrel, the second barrel is arranged around the first barrel to form the annular space.

4. The device capable of picking up optical elements as described in claim 3, wherein the central axis of the first barrel coincides with that of the second barrel, the number of the at least one first suction tube is more than one, and the at least one first suction tube are arranged around the central axis of the first barrel, the number of the at least one second suction tube is more than one, and the at least one second suction tube are arranged around the central axis of the second barrel.

5. The device capable of picking up optical elements as described in claim 3, wherein the second barrel comprises a second sidewall and a second bottom, the second bottom defines at least one first orifice penetrating two ends thereof, the at least one second suction tube is inserted into the second bottom through the first orifice, thereby communicating with the annular space.

6. The device capable of picking up optical elements as described in claim 5, wherein the first sidewall defines a first opening, the second sidewall defines a second opening and a third opening, the first opening is aligned with the second opening; the liquid spraying unit comprises a container, a liquid spraying pump, a first spraying conduit and a second spraying conduit, the container is configured for holding the liquids, the liquid spraying pump is configured for drawing the liquids from the container and pouring into the first spraying conduit and the second spraying conduit, the first spraying conduit extends through the third opening, thereby communicating with the annular space, and the second spraying conduit extends through the second opening and the first opening in turn, thereby communicating with the chamber.

7. The device capable of picking up optical elements as described in claim 6, wherein a first valve is connected to the first spraying conduit to control the flow of the liquid in the first spraying conduit, and a second valve is connected to the second spraying conduit to control the flow of the liquid in the second spraying conduit.

8. The device capable of picking up optical elements as described in claim 6, further comprising a sealing element comprising a first washer, a second washer and a third washer, wherein the first washer is arranged around the first spraying conduit and is retained tightly within the third opening, the second washer is arranged around the second spraying conduit and is retained tightly within second opening, and the third washer is arranged around the second spraying conduit and is retained tightly within the first opening.

9. The device capable of picking up optical elements as described in claim 8, wherein the first washer, the second washer, and the third washer are annular and elastic.

10. The device capable of picking up optical elements as described in claim 5, wherein the shape and number of the at least one second suction tubes match that of the at least one first orifices.

11. The device capable of picking up optical elements as described in claim 2, wherein the first bottom defines at least one first through hole penetrating two ends thereof, the at least one first suction tube is inserted into the first bottom through the at least one first through hole, thereby communicating with the chamber.

12. The device capable of picking up optical elements as described in claim 11, wherein the number and the shape of the at least one first suction tube matches those of the at least one first through hole of the first bottom.

13. The device capable of picking up optical elements as described in claim 1, wherein the vacuum pump unit comprises a first vacuum pump and a second vacuum pump, the first vacuum pump communicates with the chamber, and is configured for pumping the air out of the chamber to create a vacuum therein, the second vacuum pump communicates with the annular space, and is configured for pumping the air out of the annular space to create a vacuum therein.

14. The device capable of picking up optical elements as described in claim 13, wherein the first vacuum pump comprises a first connecting tube communicating with the chamber, and the second vacuum pump comprises at least one second connecting tube communicating with the annular space.

15. The device capable of picking up optical elements as described in claim 1, wherein the distances between the at least one second suction tube are greater than the distances between the at least one first suction tube, which allows the at least one second suction tube to apply suction to larger optical elements than the at least one first suction tube.

16. A method for picking up a first optical element and a second optical element implemented by a device as described in any one of claims 1-14 and 6-9, comprising:
   pumping the air out of the first suction member of the device to create a vacuum therein, thereby sucking a second optical element to the first suction member;
   pumping air out of the second suction member of the device to create a vacuum therein, thereby sucking a first optical element to the second suction member;
   after the first optical element has been held in position, pouring liquids into the second suction member, and stopping to pump the air out of the second suction member, wherein when the liquids volatilize in the second suction member to fill the vacuum, the first optical element disengages from the second suction member; and
   after the first optical element disengages from the first suction member, and the second optical element has been held on position, pouring the liquids into the first suction member, and stopping to pump the air out of the first suction member, wherein when the liquids volatilize in the first suction member to fill the vacuum, the second optical element disengages from the first suction member.

* * * * *